Aug. 30, 1966   L. V. HEBENSTREIT   3,269,186
TEMPERATURE COMPENSATED PRESSURE INDICATOR
Filed July 22, 1963   2 Sheets-Sheet 1
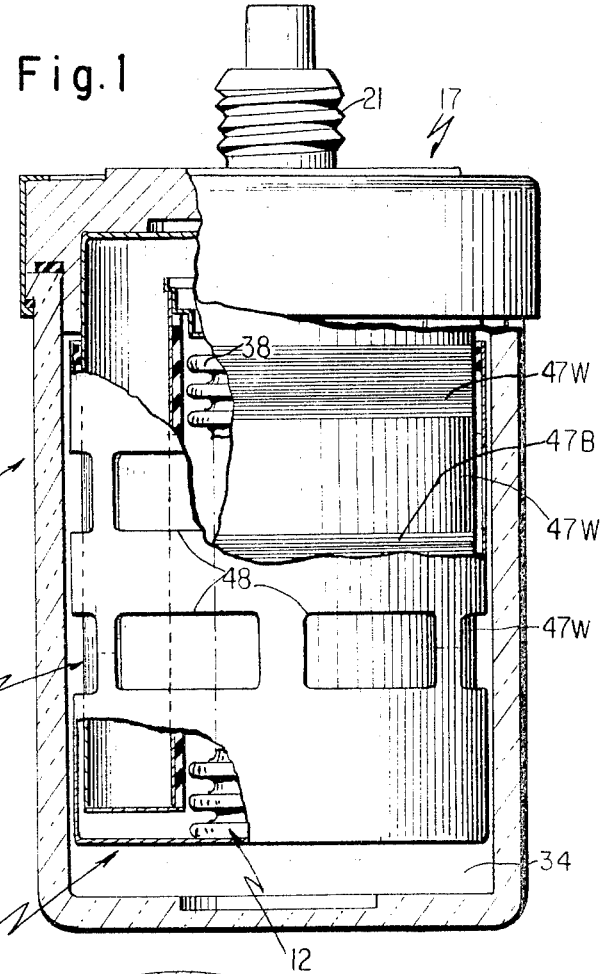
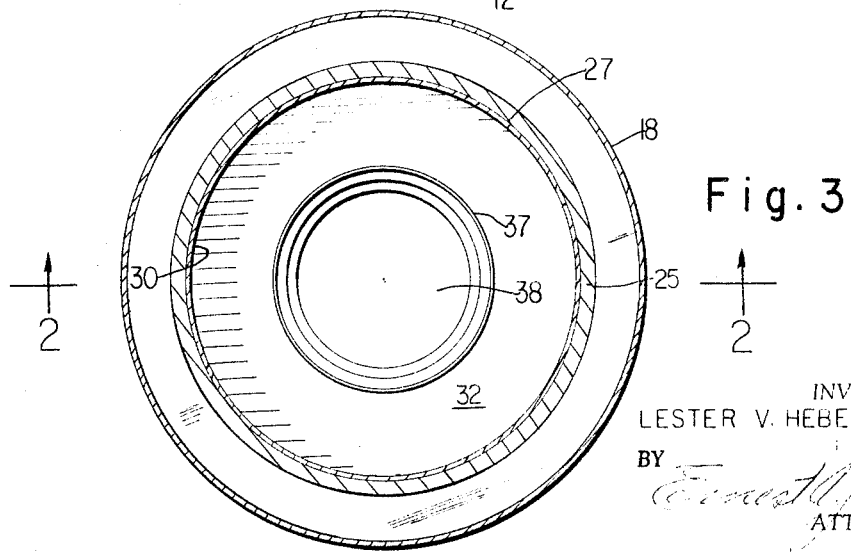
INVENTOR.
LESTER V. HEBENSTREIT
BY
ATTORNEY

United States Patent Office 3,269,186
Patented August 30, 1966

3,269,186
TEMPERATURE COMPENSATED PRESSURE INDICATOR
Lester V. Hebenstreit, Bloomfield, N.J., assignor to Specialties Development Corporation, Belleville, N.J., a corporation of New Jersey
Filed July 22, 1963, Ser. No. 296,620
6 Claims. (Cl. 73—393)

The present invention relates to indicators, and, more particularly, to an improved temperature compensated pressure loss indicator.

The present invention, while suitable for other fields of application, is primarily concerned with helicopter propeller blades operated at temperatures ranging from −65 to 160° F. Such blades are hollow and are sealed to confine therein an inert gas such as nitrogen at a pressure of about 10 p.s.i.g. so that fatigue cracks in the blades can be detected by a pressure loss indication before a dangerous situation is approached. Heretofore, no satisfactory pressure loss indicator has been devised which is accurate within such temperature range.

Accordingly, an object of the present invention is to provide a temperature compensated loss indicator.

Another object is to provide such an indicator which is accurate and reliable at any temperature within the range of atmospheric temperatures and which will indicate a relatively small loss of pressure to thereby prevent the occurrence of a dangerous situation.

Another object is to provide such an indicator which gives a clear and understandable visual indication from practically any position the indicator is viewed.

Another object is to provide such an indicator which is rugged in construction and is unaffected by vibrations but yet is compact and light in weight.

A further object is to provide such an indicator which is simple, practical and economical in construction and assembly.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a side elevational view of an indicator in accordance with the present invention, with its indicating member in normal position, a portion of the indicating member being broken away to show indicia underneath the member.

FIG. 3 is a sectional view taken along the line 3—3 on FIG. 2.

Figure 2:
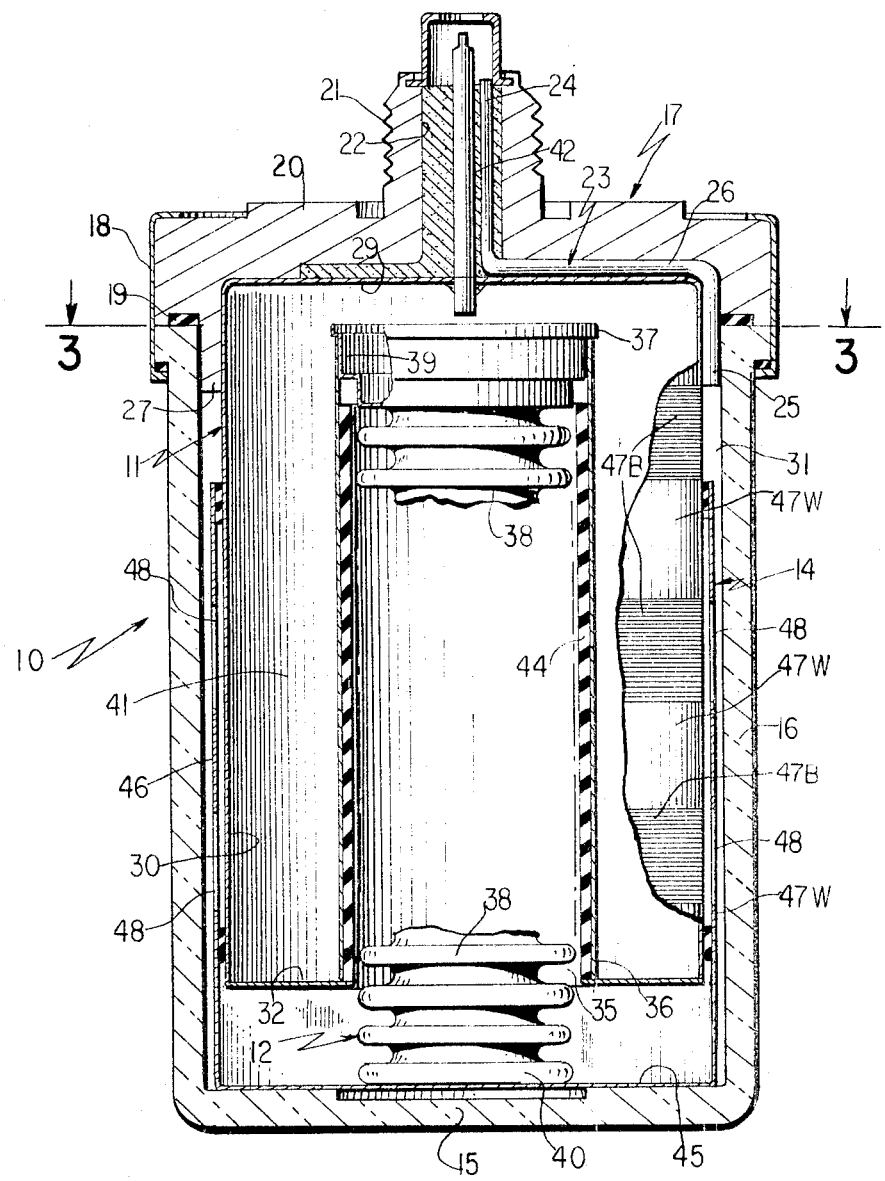
FIG. 2 is an enlarged longitudinal sectional view of the indicator shown in FIG. 1 with the indicating member in an abnormal or indicating position.

Referring now to the drawings in detail, there is shown a pressure loss indicator which generally comprises a closed housing 10, a closed casing 11 in the housing, a pressure responsive element 12 in the housing and operatively connected to the casing, and an indicator member 14 connected to the element 12 for movement therewith.

The housing 10 comprises a tubular body member having a closed end wall 15, a side wall 16 and an open end opposite the closed end wall; a closure 17 secured to the open end of the body member side wall 16 by a ring or sleeve 18; and a gasket 19 for providing a seal between the body and the closure. The closure 17 has a cover portion 20 provided with a spud 21 thereon which is formed with an opening 22 for fluid flow connection of the interior of the housing to a receptacle such as a helicopter blade (not shown) containing a gaseous medium under pressure to be monitored. Preferably, the gaseous medium is conducted through the opening 22 by a tube 23 having an outer section 24 in the opening 22, an inner section 25 in the housing and an intermediate section 26 at the inner side of the cover portion 20. The closure 17 also has a tubular skirt 27 positioned within the body member at its open end.

The casing 11 comprises an end wall 29 secured to the inner side of the cover portion 20 of the closure 17 and overlying the tube section 26 to retain the tube 23 in assembly, a tubular side wall 30 on the end wall 29 having an end portion inserted into the skirt 27 of the closure and being spaced from the inner side of the body member side wall 16 to provide an annular passageway 31, an end wall 32 at the other end of the side wall 30 spaced from the inner side of the body member end wall 15 to provide a chamber 34 (FIG. 1) for the gaseous medium entering the housing and having a central opening 35, and a well provided by a sleeve or tube 36 connected at its outer end to the end wall 32 and extending axially towards the casing end wall 29 and being provided with an open inner end 37 facing and spaced from the wall 29.

The pressure responsive element 12 comprises a tubular bellow 38 having an open inner end 39 secured and sealed within the inner end 37 of the well sleeve 36 and having an outer end 40 which is closed in the manner about to be described, whereby the casing 11 and the element 12 provide a closed chamber 41. A known mass of gaseous medium under pressure is introduced into the chamber 41 by a tube 42 extending through the opening 22 and the casing wall 29, the outer end of the tube 42 thereafter being closed and sealed to confine the gaseous medium in the chamber 41.

Preferably, the bellows 38 is constructed and arranged to exert a spring force tending to extend the same lengthwise, and a tube 44 of soft material is positioned between the bellows and the inner wall of the sleeve 36 for cushioning the bellows against vibration and against abrasive wear by relative movement with respect to the sleeve 36.

The indicator member 14 comprises an end wall 45 secured and sealed to the outer end 40 of the bellows to close the same and move with the bellows, and a tubular side wall 46 positioned between the housing side wall 16 and the casing side wall 30 for sliding movement on the wall 30. The indicator member 14 has indicia thereon and the housing side wall 16 is constructed and arranged to enable such indicia to be viewed. To accomplish the foregoing, the body member is constructed of transparent plastic resin, the outer side of the casing side wall 30 has alternate bands of two different colors, 47B (black) and 47W (white) of two different colors, and the indicator member side wall 46 has lengthwise spaced, circumferentially extending slots 48 for exposing only the white bands 47W while the indicator member is in a normal position (FIG. 1) and for exposing the black band 47B first partly and then completely while the indicator member moves to an abnormal position (FIG. 2). In order to provide a sharp contrast when the black bands are exposed, the color of the outer side of the wall 46 closely matches the white bands 47W.

In a specific embodiment of the present invention, the chamber 34 and the passageway 31 have a volumetric capacity of about 1.6 cubic inches when the bellows is fully extended with the indicator member wall 45 engaging the housing end wall 15; and the chamber 41 has a volumetric capacity of about 3.5 cubic inches when the bellows is so extended. The gaseous pressure medium to be monitored may be air or nitrogen which normally should have a pressure of about 10 p.s.i.g. at 70° F. A mass of the same gaseous pressure medium is confined in the chamber 41 to provide a force acting on the bellows from top to bottom due to the pressure in the chamber 41 or the combined effect of such pressure and the spring force of the bellows which force is effective to extend the bellows in the event the pressure of the monitored medium decreases.

Such decrease in pressure may occur when the receptacle such as the helicopter blade is exposed to decreasing ambient temperatures but indication of pressure loss is not indicated because the gas in the chamber 41 is similarly exposed to such decreasing temperature and also decreasing in pressure, whereby the bellows does not respond and remains in its normal position as shown in FIG. 1. Likewise, an increase in ambient temperature will not affect the bellows. Since the capacity of the chamber 41 is much greater than the change in volume of this chamber when the bellows responds and the bellows has low spring force, a highly sensitive indicator is provided throughout the entire temperature range of −65° to 160° F.

Indication commences when there is a very slight pressure loss, and indication is complete (FIG. 2) when the pressure of the medium to be monitored decreases about 15% of the normal pressure at any given temperature. Also, in the event the chamber 41 leaks, an indication is given because of the bellows spring force and the source of trouble can be determined and corrected.

The pressure indicator in accordance with the present invention fits in a 2 x 2 x 3 inch envelope and weighs approximately 0.4 pound. By reason of its circular configuration and the sharp contrast of the colored indicia, indication can be clearly seen from any point around the indicator and at a considerable distance.

From the foregoing description, it will be seen that the present invention provides a practical and reliable pressure loss indicator which is operable through a wide range of temperatures.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A pressure indicator comprising a closed tubular housing having an opening for fluid flow connection of said housing to a receptacle containing a gaseous medium under pressure to be monitored, a closed tubular casing secured in said housing for containing a constant mass of gaseous medium under pressure having a wall at one end and having an axially extending sleeve at its other end provided with open inner and outer ends, a tubular pressure responsive element in said sleeve having an open inner end sealed within the open inner end of said sleeve and having a closed outer end extending outwardly of said sleeve, whereby the constant mass of gaseous medium is confined within said casing and said element is movable in response to pressure changes of the gaseous medium in said housing, and an indicator member connected to said pressure responsive element for movement therewith, said housing being constructed and arranged for viewing said indicator member, said casing and said indicator member being provided with indicia for giving an indication of pressure loss in said housing and said housing having a transparent wall adjacent said indicia, said indicator member having an end wall secured to the closed end of said pressure responsive element and having a tubular side wall disposed between said housing and said casing, and said indicia includes alternate bands of two different colors on said casing and lengthwise spaced circumferentially extending slots in said side wall of said indicator member for exposing bands of one color while the gaseous medium in said housing is under normal pressure and for exposing bands of the other color while the gaseous medium in said housing is under an abnormal pressure.

2. A pressure indicator comprising a closed tubular housing having an opening for fluid flow connection of said housing to a receptacle containing a gaseous medium under pressure to be monitored, a closed tubular casing secured in said housing for containing a constant mass of gaseous medium under pressure having a wall at one end and having an axially extending sleeve at its other end provided with open inner and outer ends, a tubular pressure responsive element in said sleeve having an open inner end sealed within the open inner end of said sleeve and having a closed outer end extending outwardly of said sleeve, whereby the constant mass of gaseous medium is confined within said casing and said element is movable in response to pressure changes of the gaseous medium in said housing, an indicator member connected to said pressure responsive element for movement therewith, said housing being constructed and arranged for viewing said indicator member, said pressure responsive element being a bellows constructed and arranged to exert a spring force on said indicator member, and a tube between said sleeve and said bellows for cushioning said bellows.

3. A pressure indicator comprising a tubular housing having a closed end and an open end, a closure for sealing said open end having an opening for fluid flow connection of said housing to a receptacle containing a gaseous medium under pressure to be monitored, a tubular casing in said housing for containing a constant mass of gaseous medium under pressure having a wall at one end secured to said closure and having a tubular well at its other end extending axially towards said wall and provided with an open inner end facing said wall, a tubular pressure responsive element in said well having an open inner end sealed within the open inner end of said well and having a closed outer end extending outwardly of said well, whereby the constant mass of gaseous medium is confined within said casing and said element and said element is movable in response to pressure changes of the gaseous medium in said housing, and an indicator member secured to said pressure responsive element for movement therewith, said housing being constructed and arranged for viewing said indicator member.

4. A pressure indicator according to claim 3, wherein the volumetric capacity of the space for gaseous medium in said casing and said pressure responsive element is greater than the volumetric capacity of the space for gaseous medium in said housing.

5. A pressure indicator according to claim 4, wherein a predetermined mass of gaseous medium is sealed in said casing and said element at a pressure for a given temperature which pressure is lower than the normal pressure of the gaseous medium to be monitored at the given temperature.

6. A pressure indicator according to claim 3, including a closable tube extending through said closure opening and said casing wall for introducing and sealing the gaseous medium in said casing and said element.

References Cited by the Examiner

UNITED STATES PATENTS 2,309,401   1/1943   Kollsman _____ 73—410

LOUIS R. PRINCE, *Primary Examiner.*

D. O. WOODIEL, *Assistant Examiner.*